(12) United States Patent
Nister et al.

(10) Patent No.: US 9,064,174 B2
(45) Date of Patent: Jun. 23, 2015

(54) SIMULTANEOUS TRACKING AND TEXT RECOGNITION IN VIDEO FRAMES

(71) Applicant: Microsoft Corporation, Redmond, WA (US)

(72) Inventors: David Nister, Bellevue, WA (US); Frederik Schaffalitzky, Mercer Island, WA (US); Michael Grabner, Seattle, WA (US); Matthew S. Ashman, Seattle, WA (US); Milan Vugdelija, Belgrade (RS); Ivan Stojiljkovic, Belgrade (RS)

(73) Assignee: Microsoft Technology Licensing, LLC, Redmond, WA (US)

( * ) Notice: Subject to any disclaimer, the term of this patent is extended or adjusted under 35 U.S.C. 154(b) by 194 days.

(21) Appl. No.: 13/654,841

(22) Filed: Oct. 18, 2012

(65) Prior Publication Data
US 2014/0112527 A1    Apr. 24, 2014

(51) Int. Cl.
G06K 9/00    (2006.01)
G06K 9/34    (2006.01)
G06K 9/32    (2006.01)

(52) U.S. Cl.
CPC .................................. *G06K 9/3266* (2013.01)

(58) Field of Classification Search
None
See application file for complete search history.

(56) References Cited

U.S. PATENT DOCUMENTS

| | | | |
|---|---|---|---|
| 7,031,553 B2 | 4/2006 | Myers et al. | |
| 7,787,693 B2 | 8/2010 | Siegemund | |
| 8,208,729 B2 | 6/2012 | Foss | |
| 2008/0101726 A1* | 5/2008 | Myers et al. | 382/289 |
| 2010/0014709 A1* | 1/2010 | Wheeler et al. | 382/103 |
| 2010/0150449 A1 | 6/2010 | Laksono | |
| 2011/0123115 A1 | 5/2011 | Lee et al. | |

OTHER PUBLICATIONS

"Video Analysis", published date May 18, 2009, retrieved at: http://www.virage.com/security-and-surveillance/functions/video-analysis/index.htm, last accessed Aug. 22, 2012, 1 page.

Serhat Tekinalp, "Detecting and Recognizing Text from Video Frames", A Thesis Submitted to the Graduate School of Natural and Applied Sciences of the Middle East Technical University, Sep. 2002, 93 pages.

Chen et al., "Automatic Detection and Recognition of Signs from Natural Scenes", In the proceedings of IEEE Transactions on Image Processing, Jan. 2004, 13 pages, vol. 13, No. 1.

* cited by examiner

*Primary Examiner* — Amara Abdi
(74) *Attorney, Agent, or Firm* — Steve Spellman; Peter Taylor; Micky Minhas

(57) ABSTRACT

Architecture that enables optical character recognition (OCR) of text in video frames at the rate at which the frames are received. Additionally, conflation is performed on multiple text recognition results in the frame sequence. The architecture comprises an OCR text recognition engine and a tracker system; the tracker system establishes a common coordinate system in which OCR results from different frames may be compared and/or combined. From a set of sequential video frames, a keyframe is chosen from which the reference coordinate system is established. An estimated transformation from keyframe coordinates to subsequent video frames is computed using the tracker system. When text recognition is completed for any subsequent frame, the result coordinates can be related to the keyframe using the inverse transformation from the processed frame to the reference keyframe. The results can be rendered for viewing as the results are obtained.

20 Claims, 8 Drawing Sheets

SIMULTANEOUS TRACKING AND TEXT RECOGNITION IN VIDEO FRAMES

BACKGROUND

Optical character recognition (OCR) is a commonly-used technique for converting image-based text into digitized text. Accordingly, OCR can also be employed in character recognition in video frames. Previous approaches have included single-frame OCR without tracking, which does not allow realtime video registration of results with the subject matter. For video-registered display of the results, other approaches have recognized and rendered results frame-by-frame, but performance suffers (e.g., processor loading) from the latency constraints of recognizing and rendering results within a single video frame interval.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture enables optical character recognition (OCR) of text in video frames at an optimal rate to the extent that the results approach the results obtained should all frames be processed. Additionally, conflation is performed on multiple text recognition results in the frame sequence. For example, OCR scanning can begin on one line of a document and then move down one line to recognize another result, and since the tracking context is maintained via a tracking reference coordinate system, these two results can be conflated (combined) to create a model of the recognized text (larger than the image currently being shown on the display). Conflation in this context is the merging of OCR results of the same line/word from different frames and keeping the more accurate recognition so that result quality improves over time. Moreover, the merging of results from different parts of the document and to scan a document that cannot fit into a single frame can also be supported.

The architecture comprises an OCR text recognition engine and a tracker system; the tracker system establishes a common coordinate system in which OCR results from different frames may be compared and/or combined. From a set of sequential video frames, a keyframe is chosen from which the reference coordinate system is established. An estimated transformation from keyframe coordinates to subsequent video frames is computed using the tracker system.

The OCR text recognition process runs asynchronously to the tracker (tracker component), and in general, may take more than one frame interval to complete processing. When text recognition is completed for any subsequent frame, the result coordinates can be related to the keyframe using the transformation from the processed frame to the reference keyframe. Comparison and/or combining of OCR results from several distinct frames can be performed in common coordinates, as long as all OCR processed frames have associated transformations from the tracker keyframe coordinate system.

Rendering of recognized text results may be registered to realtime video by applying the estimated transformation (homography) from the keyframe coordinates of the recognized text to the latest frame processed by the tracker.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
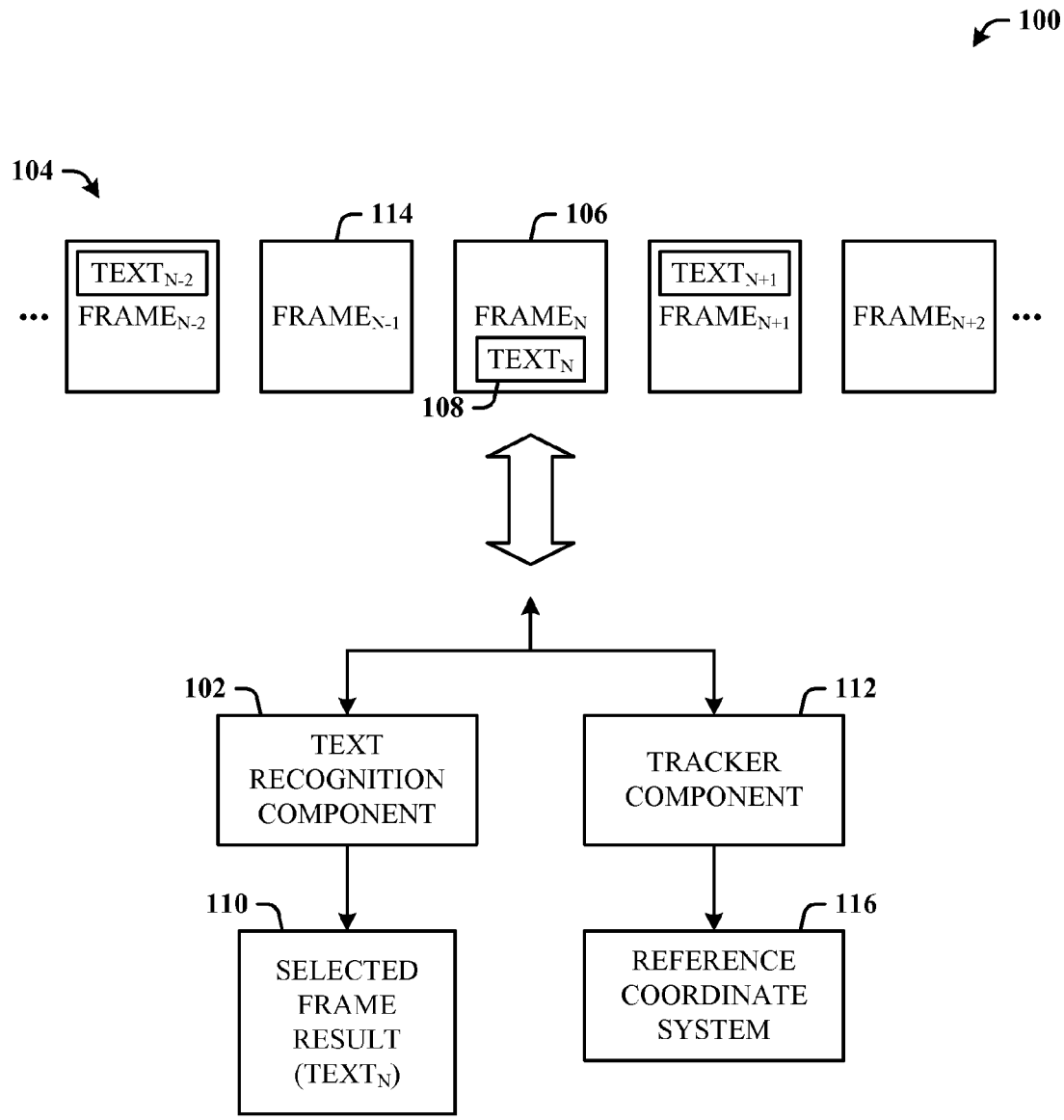
FIG. 1 illustrates a system in accordance with the disclosed architecture.

The disclosed architecture performs OCR (optical character recognition) on realtime video frames, with results that are tracked and registered to the coordinate system of the recognized subject matter. For example, using a camera pointed at a page of text, the architecture enables simultaneous text recognition and display of results, which are then registered to the page in realtime video. This is accomplished using a coordinate tracking computer vision algorithm.

The architecture improves OCR accuracy obtained by conflation (combining) of OCR results from multiple video frames. Conflation of multiple results is enabled by applying a tracking algorithm to establish a common coordinate system in which the video frames may be related. Additionally, the architecture "masks" OCR latency for the user when processing video by tracking the recognized subject matter while OCR is asynchronously processing over a number of the video frames. The OCR results are registered to the text subject matter by accurately rendering results directly onto the tracked video frames.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a system 100 in accordance with the disclosed architecture. The system 100 can include a text recognition component 102 for recognition (optical character recognition) of text in a sequence of video frames 104. The text recognition component 102 receives a selected frame (FRAME$_N$) 106 of the sequence of video frames 104 and performs text recognition processing of the selected frame 106 to recognize (TEXT$_N$) 108 for output as a selected frame result 110. The selected frame result 110 can include the recognized text and a bounding box that circumscribes the text.

A tracker component 112 selects a keyframe 114 from the sequence of video frames 104 and establishes a reference coordinate system 116 relative to the selected keyframe 114. The selected frame result 110 is mapped back to the keyframe 114 based on the coordinate system 116.

The tracker component 112 estimates a transformation between the reference coordinate system 116 and the selected frame result 110. The tracker component 112 estimates the transformation between the reference coordinate system 116 and the selected frame 106 to map the selected frame result 110 back to the keyframe 114. In other words, the reference coordinate system relates recognized text coordinates of the text of the selected frame 106 back to the keyframe 114 based on the estimated transformation established between the keyframe 114 and the selected frame 106.

Put another way, the architecture comprises the OCR text recognition engine, and the tracker system (tracker component 112), which is used to establish a common coordinate system based on which OCR results from different frames may be compared and/or combined. From the set of sequential video frames, the keyframe (the reference frame) is chosen from which the reference coordinate system is established. An estimated transformation (homography) from keyframe coordinates to subsequent video frames is computed using the tracker system.

The OCR text recognition process runs asynchronously to the tracker system, and in general, may take more than one frame interval to complete processing. When text recognition is completed for any subsequent frame, the result coordinates can be related to the keyframe using the transformation from the processed (selected) frame to the reference keyframe. In one implementation, selection of keyframe results can then be made and rendered for viewing. Alternatively, conflation can be employed for the comparison and/or combining of OCR results from several distinct frames in common coordinates, as long as all OCR processed frames have associated transformations from the tracker keyframe coordinate system.

Rendering of recognized text results may be registered to realtime video by applying the estimated transformation (homography) from the keyframe coordinates of the recognized text to the latest frame processed by the tracker system. Other reference coordinates and transformations approaches can be used (e.g., affine, similarity, other planar approximations, etc.), as long as these approaches can be related to the keyframe coordinate system.

Figure 2:
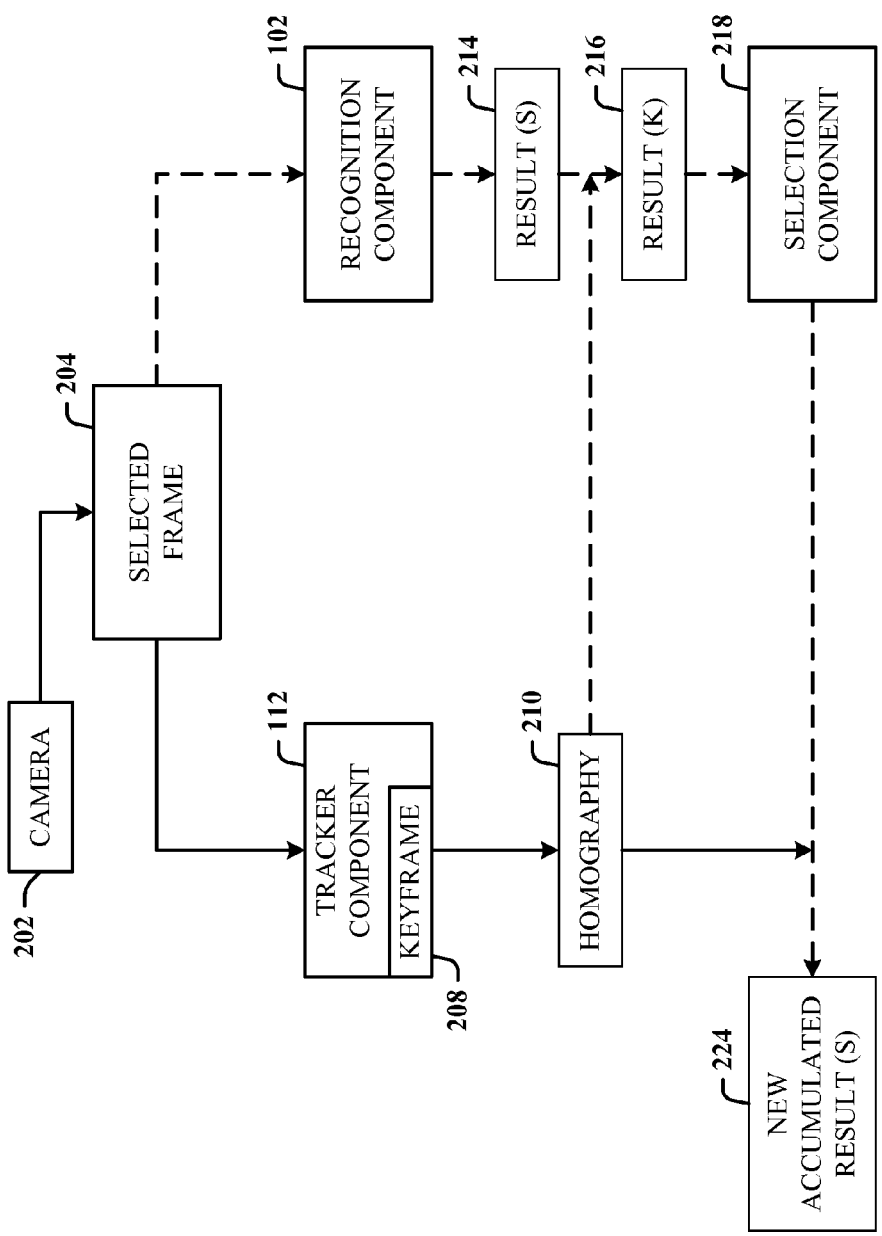
FIG. 2 illustrates an alternative simultaneous tracking and text recognition flow and system diagram.

FIG. 2 illustrates an alternative simultaneous tracking and text recognition flow and system diagram 200. The diagram 200 shows a camera 202 or other type of frame generation component where a selected frame 204 (similar to selected frame 106) is being processed. The selected frame 204 is the most recent frame of a sequence of frames. Optimally, the tracker component 112 is processing (tracking) every frame and also selects a frame as a keyframe 208 (similar to keyframe 114). Each time a frame (e.g., the selected frame 204) is received and processed, an estimate of the transformation (reference coordinate system) (e.g., homography 210 for the selected frame 204) from the keyframe 208 (depicted inside the tracker component 112) to subsequent frames in that sequence, is produced. The keyframe 208 (image) can be selected based on the application of stability criteria to the incoming images (frames). A homography (e.g., homography 210) is computed from the keyframe 208 to each of the frames subsequent to the keyframe 208 for mapping text back to the keyframe 208.

On the recognition side, text OCR by the recognition component 102 is occurring independent of the tracking The recognition component 102 finds the "good" frames (those frames deemed to be acceptable relevant to some threshold) and processes the good frames as quickly as it can; however, in general, recognition processing will likely not be able to keep up with the tracking It can be the case that several frames have elapsed by the time OCR results are output from the recognition component 102. Here, the result 214 is one of many possible recognized text instances from the selected (S) frame 204.

In this depiction, the homography 210, as applied to the result 214, produces a selected keyframe result 216, annotated with K (keyframe) to indicate a result of the selected frame 204 as now related back to the keyframe 208 using the homography mapping.

A selection component 218 selects the keyframe result 216 and outputs it as a new accumulated selected result 224 as mapped using the homography. The best of the new accumulated results 308 is then selected for rendering and viewing. Selection can be simply based on what the result is that is output as the keyframe result 216.

Figure 3:
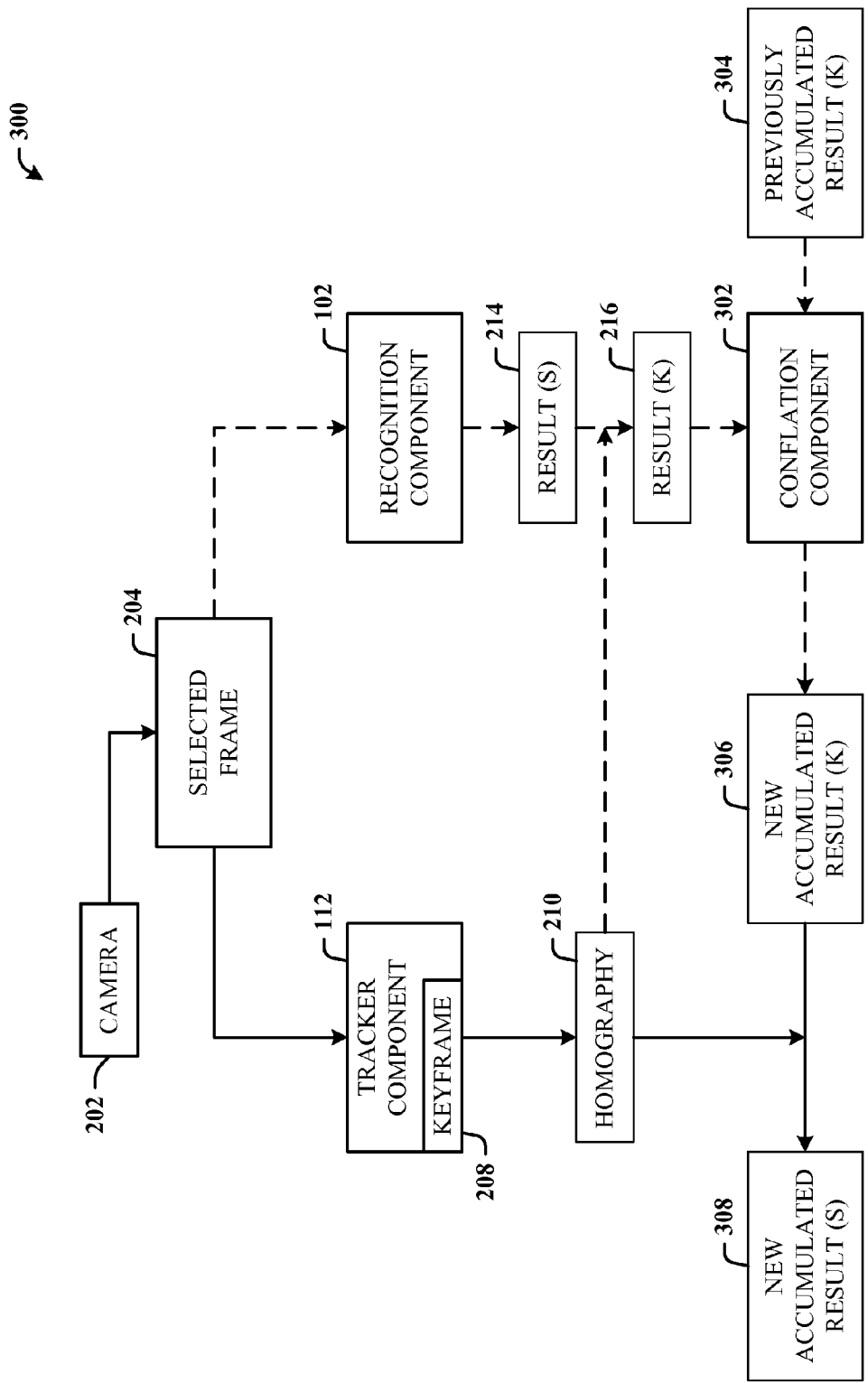
FIG. 3 illustrates an alternative simultaneous tracking and text recognition flow and system diagram that employs conflation.

FIG. 3 illustrates an alternative simultaneous tracking and text recognition flow and system diagram 300 that employs conflation. The camera 202 is inputting the selected frame 204 (of many video frames). The selected frame 204 is the most recent frame of a sequence of frames. Optimally, the tracker component 112 is processing every frame and also selects a frame as the keyframe 208. Each time a frame (e.g., the selected frame 204) is received, an estimated transformation (e.g., homography 210) is created from the keyframe 208 to subsequent frames in that sequence. As before, the keyframe 208 (image) can be selected based on the application of stability criteria to the incoming images. A homography (e.g., homography 210 for the selected frame 204) is computed from each of the subsequent frames to the keyframe 208 that maps recognized text of the given frame back to the same location in the keyframe 208.

On the recognition side, text OCR by a recognition component 102 is occurring independent of the tracking, and as described above on diagram 200. In this instance, the homography 210, as applied to the selected result 214, produces selected keyframe result 216, annotated with K (keyframe) to indicate a result of the selected frame 204 is now related back to the keyframe 208 using the homography mapping.

In this embodiment, a conflation component 302 is employed that conflates (merges) a previously accumulated keyframe result 304 with the selected keyframe result 216 (the result from the selected frame in the keyframe coordinate system) to output a new accumulated keyframe result 306, which is then mapped back (based on the homography 210) as the new accumulated result 308, which is the latest and best output at that given moment and which can be rendered for viewing. In other words, the result 216 and new accumulated result 306 are single instances of text/bounding box for a recognized word in the frame (as well as selected result 214, previously accumulated keyframe result 304, and new accumulated result 308). Any of these single instances comprise a set of one instance of text, bounding box, and confidence score; a set for each recognized word in the frame. The coordinates of the bounding boxes can be expressed either in the coordinate system of the keyframe (K) or the coordinate system of the selected frame (S).

The homography 210 is used to transform the accumulated results from the keyframe coordinate system to the coordinate system of the selected frame 204 so that the results can be rendered over the selected frame 204. What the user can see is the "morphing" of a first instance of recognized text into an optimum version of the text.

The conflation component 302 combines the selected frame result 214 with a previously-accumulated frame result 304 of other frames of the sequence of video frames. The conflation component 302 can employ statistical error correction to improve the conflated frame results (the new accumulated keyframe result 306). The conflated frame result can then be rendered on a display. In terms of only this selected frame result 214 and selected frame 204, the selected frame result 214 can be rendered directly into the selected frame 204.

Figure 4:
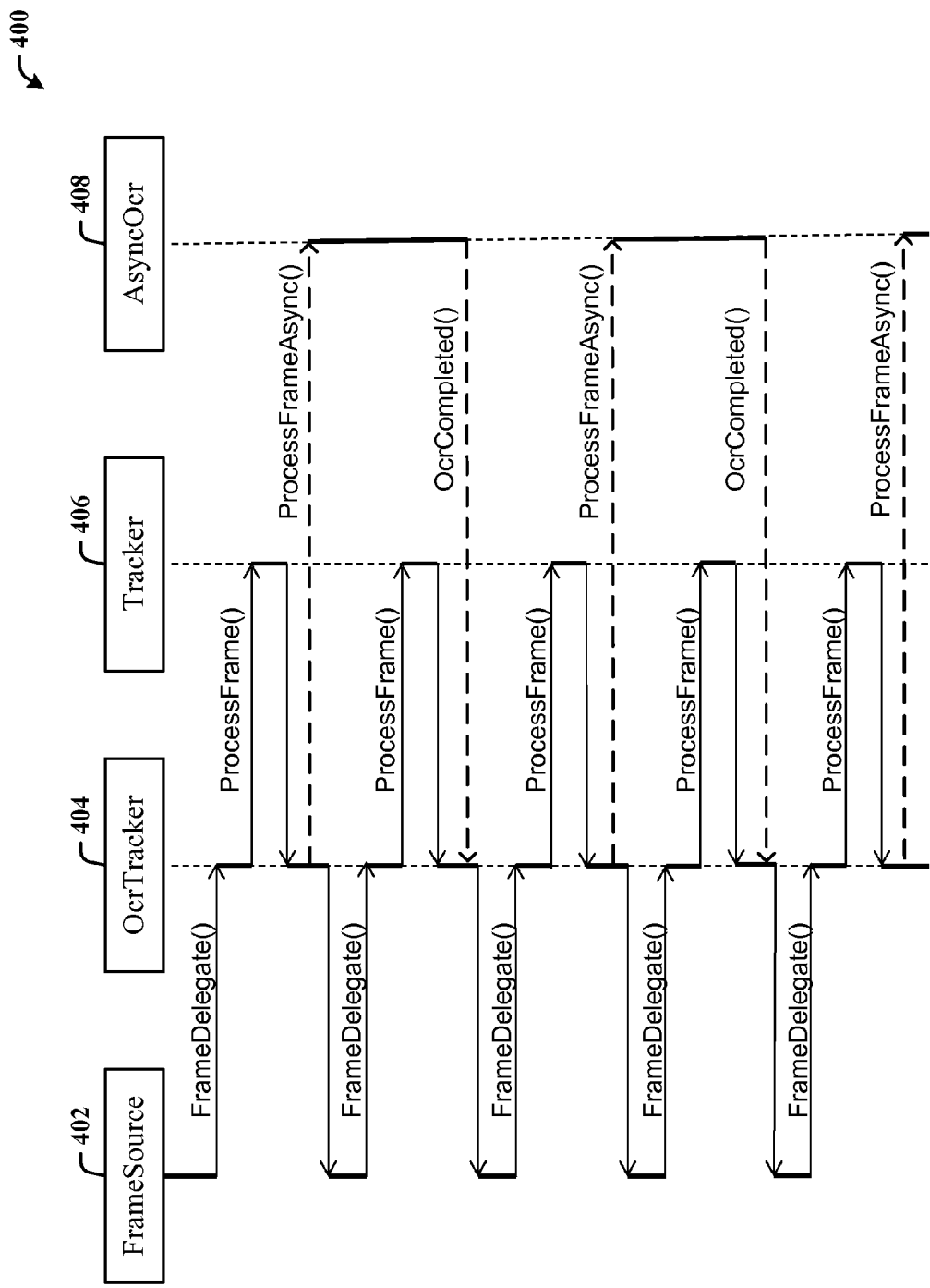
FIG. 4 illustrates an operational sequence diagram for OCR tracking.

FIG. 4 illustrates an operational sequence diagram 400 for OCR tracking The tracker component 112 is initialized when the keyframe is selected (identified). The internal model comprises the image and some extracted distinctive point locations in image space and a 3×3 transformation matrix, referred to as reference coordinate system 116 and the homography 210. The homography 210 describes the mapping of points between the initial keyframe and the selected frame which is to be tracked (registration). Initially, this transformation $H_0$ is equal to the 3×3 identity matrix.

Consider that n frames have been tracked successfully and frame (n+1) is received. The last computed transformation $H_n$ is used as a prior reference to /transform points into frame (n+1). A goal is now to find the homography $H_{n+1}$ for the frame n+1. Each transformed point's location is refined by cropping an appearance patch from the original keyframe and and performing a normalized cross correlation search at the transformed point location in frame (n+1). This provides the interframe motion of points inbetween successive frames, which information can be used to update transformation H to transformation $H_{n+1}$.

With respect to the OCR tracker, a method FrameSource 402 (functions to receive the video frames from the device, e.g., camera 202) delivers a sequence of video frames to the OcrTracker 404 via a FrameDelegate( ) method. The OcrTracker 404 calls Tracker.ProcessFrame( ) method of a Tracker 406 (similar to the tracker component 112) with each frame. The Tracker 406 drops (selects) a keyframe F[0] against which all subsequent frames will be tracked (registered). Subsequent tracked frames and associated homographies are indicated by F[n], H[n]. The homography H[n] can be used to render content which is registered to planar content in the frame F[n].

OcrTracker 404 calls AsyncOcr.ProcessFrameAsync( )for an AsyncOcr 408 method with some tracked frame F[n] for text recognition, which may take more than one frame interval to complete, and therefore, is asynchronous, in general. After AsyncOcr 408 is finished with frame F[n], the recognized text coordinates are inverse-projected (inverse transformation) to the keyframe coordinate system using the inverse of the associated homography H[n] and the result is returned to the OcrTracker 404by an OcrCompleted( )event callback.

Multiple results from AsyncOcr 408 can be conflated by comparison in the common keyframe coordinate system. Conflated text results may be improved by replacing low confidence words or lines with higher confidence words or lines.

Figure 5:
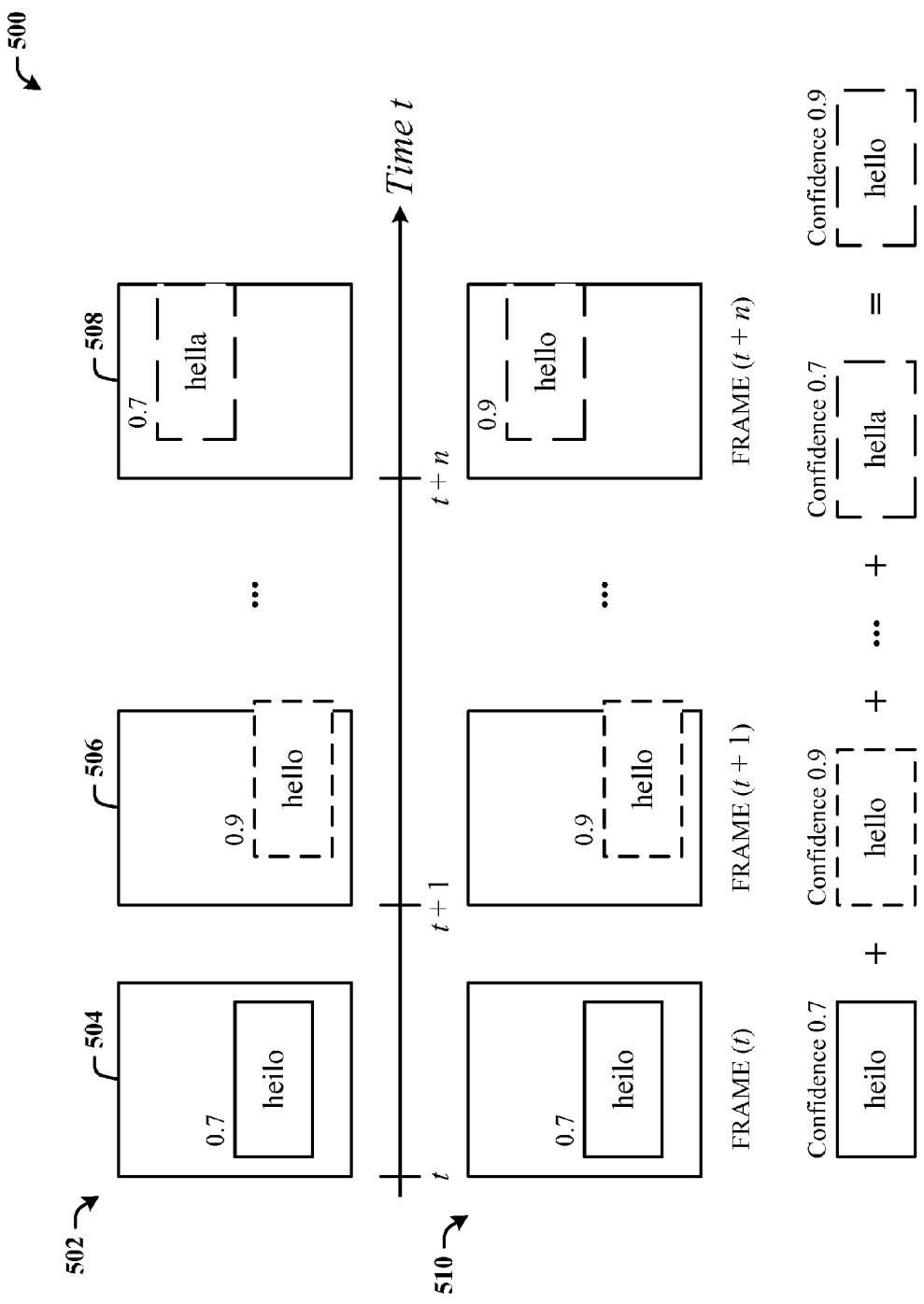
FIG. 5 illustrates a diagram of conflation in accordance with the disclosed architecture.

FIG. 5 illustrates a diagram 500 of conflation in accordance with the disclosed architecture. At the top is a series of individual OCR results 502 for a sequence of frames (e.g., the sequence of frames 104), without conflation. A first frame 504 includes recognized text "heilo" (with a confidence score of 0.7) in an associated bounding box of known dimensions and coordinates based on an established (created) coordinate system of the first frame 504. The homography facilitates mapping back the "heilo" bounding box to the keyframe coordinate system using the transformation. Without conflation processing, the text "heilo" and/or bounding box can then be rendered at the corresponding coordinates of the keyframe image for viewing.

A second frame 506 includes recognized text "hello" (with a confidence score of 0.9) in an associated bounding box of known dimensions and coordinates based on an established (created) coordinate system of the second frame 506. The homography facilitates mapping back the "hello" bounding box to the keyframe coordinate system using the inverse of the homography. Without conflation processing, the text "hello" and/or bounding box can then be rendered at the corresponding coordinates of the keyframe image for viewing.

Similarly, an nth frame 508 includes recognized text "hella" (with a confidence score of 0.7) in an associated bounding box of known dimensions and coordinates based on an established (created) coordinate system of the nth frame 508. The homography facilitates mapping back the "hella" bounding box to the keyframe coordinate system using the inverse of the homography.

Without conflation processing, the text "hella" and/or bounding box can then be rendered at the corresponding coordinates of the keyframe image for viewing.

At the bottom is the series of individual OCR results 510 for the sequence of frames (e.g., the sequence of frames 104), with conflation. As before, recognition processing and tracking result in registration of the text "heilo" (and bounding box) with a confidence score of 0.7 and text "hello" (and bounding box) with a confidence score of 0.9. However, continual conflation processing of previously accumulated results finalizes with the text "hello" (and bounding box) with a confidence score of 0.9 being the finalized text presented in the keyframe for viewing. The conflation process can always retain one of the words from the input frames.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
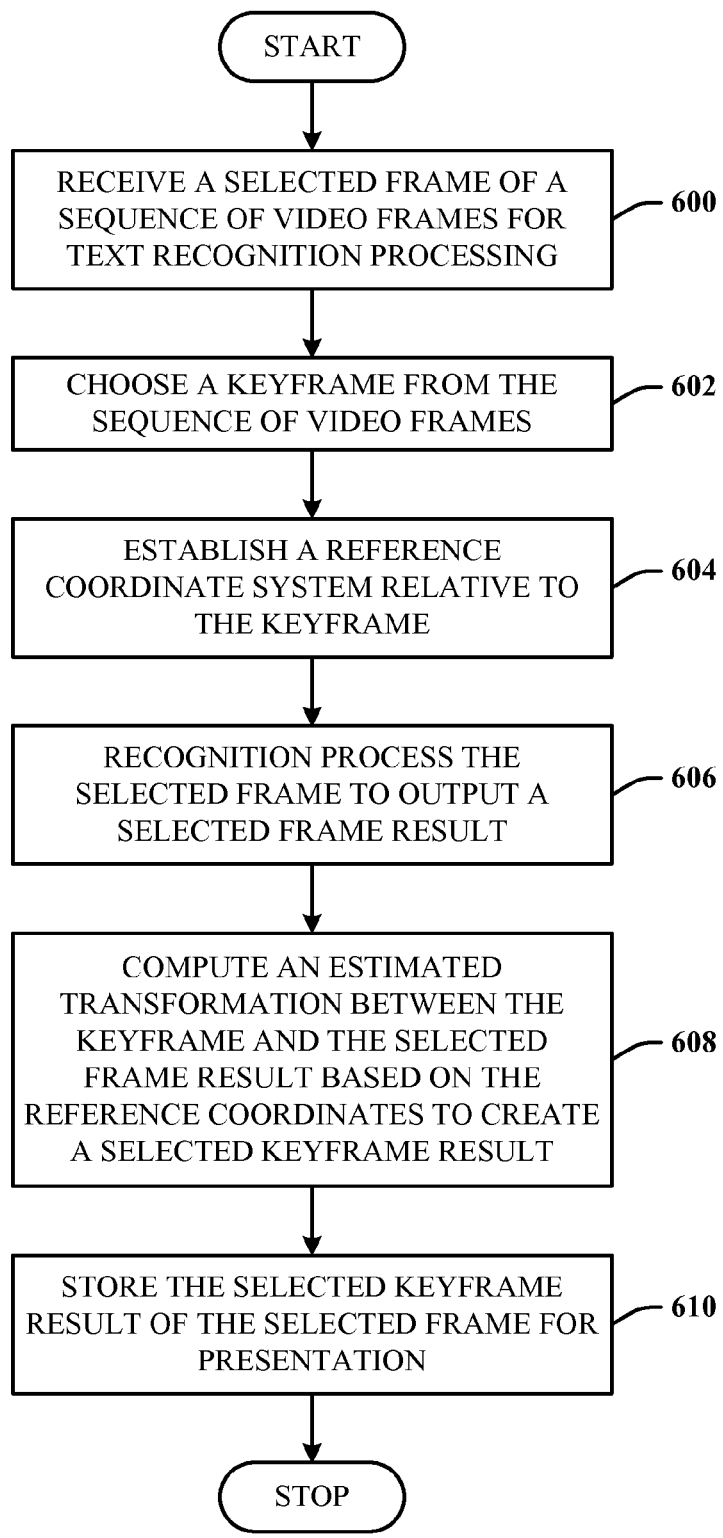
FIG. 6 illustrates a method in accordance with the disclosed architecture.

FIG. 6 illustrates a method in accordance with the disclosed architecture. The method performed by a computer system executing machine-readable instructions. At 600, a selected frame of a sequence of video frames is received for text recognition processing. At 602, a keyframe is chosen from the sequence of video frames. At 604, a reference coordinate system is established relative to the keyframe. At 606, the selected frame is recognition processed to output a selected frame result. At 608, an estimated transformation is computed between the keyframe and the selected frame result based on the reference coordinate system to create a selected keyframe result. At 610, the selected keyframe result of the selected frame is stored for presentation.

The method can further comprise acts of combining the selected keyframe result with a previously-accumulated keyframe result to create new accumulated selected results, and presenting the new accumulated selected results after each frame. The method can concurrently perform the acts of selecting, establishing, recognizing, and tracking The method can further comprise acts of tracking features in the selected frame to compute the estimated transformation, and rendering frame results directly into tracked video frames.

Figure 7:
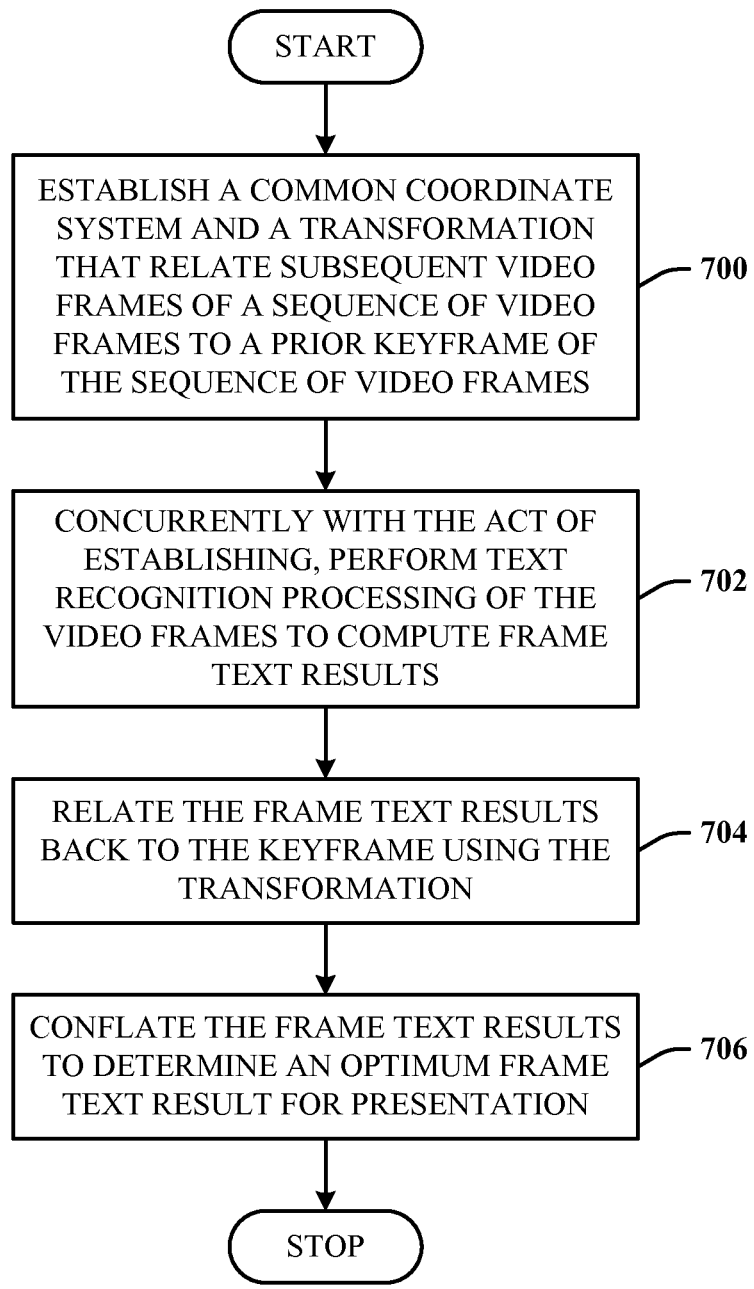
FIG. 7 illustrates an alternative method in accordance with the disclosed architecture.

FIG. 7 illustrates an alternative method in accordance with the disclosed architecture. At 700, a common coordinate system and a transformation are established that relate subsequent video frames of a sequence of video frames to a prior keyframe of the sequence of video frames. At 702, concurrently with the act of establishing, text recognition processing of the video frames is performed to compute frame text results. At 704, the frame text results are related back to the keyframe using the transformation. At 706, the frame text results are conflated to determine an optimum frame text result for presentation.

The method can further comprise acts of registering the recognized frame text results to realtime video by applying the transformation from the keyframe coordinates to a latest frame being processed, and combining a selected frame text result with previously-accumulated frame text result of another frame, as part of the act of conflating.

The method can further comprise acts of establishing a transformation for each video frame to relate associated frame text results to the keyframe, and tracking the recognized frame text results while asynchronously performing text recognition processing over the video frames.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program.

By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 8:
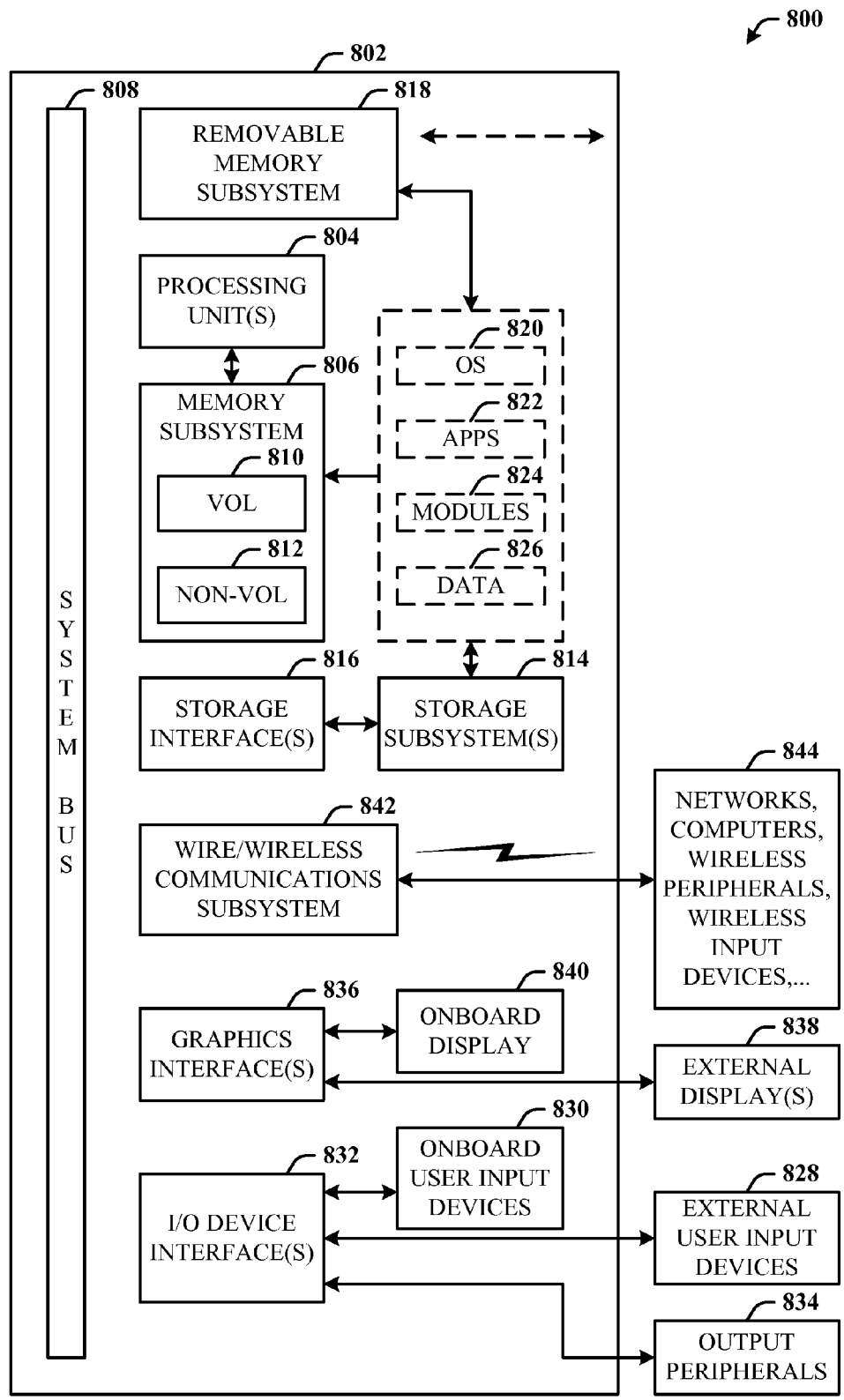
FIG. 8 illustrates a block diagram of a computing system that executes concurrent tracking and text recognition in accordance with the disclosed architecture.

Referring now to FIG. 8, there is illustrated a block diagram of a computing system 800 that executes concurrent tracking and text recognition in accordance with the disclosed architecture. However, it is appreciated that the some or all aspects of the disclosed methods and/or systems can be implemented as a system-on-a-chip, where analog, digital, mixed signals, and other functions are fabricated on a single chip substrate.

In order to provide additional context for various aspects thereof, FIG. 8 and the following description are intended to provide a brief, general description of the suitable computing system 800 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 800 for implementing various aspects includes the computer 802 having processing unit(s) 804 (also referred to as microprocessor(s) and processor(s)), a computer-readable storage such as a system memory 806, and a system bus 808. The processing unit(s) 804 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, tablet PC, etc.), hand-held computing devices, microprocessor-based or programmable consumer electronics, and the like, each of which can be operatively coupled to one or more associated devices.

The computer 802 can be one of several computers employed in a datacenter and/or computing resources (hardware and/or software) in support of cloud computing services for portable and/or mobile computing systems such as cellular telephones and other mobile-capable devices. Cloud computing services, include, but are not limited to, infrastructure as a service, platform as a service, software as a service, storage as a service, desktop as a service, data as a service, security as a service, and APIs (application program interfaces) as a service, for example.

The system memory 806 can include computer-readable storage (physical storage media) such as a volatile (VOL) memory 810 (e.g., random access memory (RAM)) and non-volatile memory (NON-VOL) 812 (e.g., ROM, EPROM, EEPROM, etc.). A basic input/output system (BIOS) can be stored in the non-volatile memory 812, and includes the basic routines that facilitate the communication of data and signals between components within the computer 802, such as during startup. The volatile memory 810 can also include a high-speed RAM such as static RAM for caching data.

The system bus 808 provides an interface for system components including, but not limited to, the system memory 806 to the processing unit(s) 804. The system bus 808 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 802 further includes machine readable storage subsystem(s) 814 and storage interface(s) 816 for interfacing the storage subsystem(s) 814 to the system bus 808 and other desired computer components. The storage subsystem(s) 814 (physical storage media) can include one or more of a hard disk drive (HDD), a magnetic floppy disk drive (FDD), solid state drive (SSD), and/or optical disk storage drive (e.g., a CD-ROM drive DVD drive), for example. The storage interface(s) 816 can include interface technologies such as EIDE, ATA, SATA, and IEEE 1394, for example.

One or more programs and data can be stored in the memory subsystem 806, a machine readable and removable memory subsystem 818 (e.g., flash drive form factor technology), and/or the storage subsystem(s) 814 (e.g., optical, magnetic, solid state), including an operating system 820, one or more application programs 822, other program modules 824, and program data 826.

The operating system 820, one or more application programs 822, other program modules 824, and/or program data 826 can include entities and components of the system 100 of FIG. 1, entities and components of the flow and system diagram 200 of FIG. 2, entities and components of the flow and system diagram 300 of FIG. 3, flow of the diagram 400 of FIG. 4, flow of the diagram 500 of FIG. 5, and the methods represented by the flowcharts of FIGS. 6 and 7, for example.

Generally, programs include routines, methods, data structures, other software components, etc., that perform particular tasks or implement particular abstract data types. All or portions of the operating system 820, applications 822, modules 824, and/or data 826 can also be cached in memory such as the volatile memory 810, for example. It is to be appreciated that the disclosed architecture can be implemented with various commercially available operating systems or combinations of operating systems (e.g., as virtual machines).

The storage subsystem(s) 814 and memory subsystems (806 and 818) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that does not employ propagated signals, can be accessed by the computer 802, and includes volatile and non-volatile internal and/or external media that is removable or non-removable. For the computer 802, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 802, programs, and data using external user input devices 828 such as a keyboard and a mouse, as well as by voice commands facilitated by speech recognition. Other external user input devices 828 can include a microphone, an IR (infrared) remote control, a joystick, a game pad, camera recognition systems, a stylus pen, touch screen, gesture systems (e.g., eye movement, head movement, etc.), and/or the like. The user can interact with the computer 802, programs, and data using onboard user input devices 830 such a touchpad, microphone, keyboard, etc., where the computer 802 is a portable computer, for example.

These and other input devices are connected to the processing unit(s) 804 through input/output (I/O) device interface(s) 832 via the system bus 808, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 832 also facilitate the use of output peripherals 834 such as printers, audio devices, camera devices, and so on, such as a sound card and/or onboard audio processing capability.

One or more graphics interface(s) 836 (also commonly referred to as a graphics processing unit (GPU)) provide graphics and video signals between the computer 802 and external display(s) 838 (e.g., LCD, plasma) and/or onboard displays 840 (e.g., for portable computer). The graphics interface(s) 836 can also be manufactured as part of the computer system board.

The computer 802 can operate in a networked environment (e.g., IP-based) using logical connections via a wired/wireless communications subsystem 842 to one or more networks and/or other computers. The other computers can include workstations, servers, routers, personal computers, microprocessor-based entertainment appliances, peer devices or other common network nodes, and typically include many or all of the elements described relative to the computer 802. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 802 connects to the network via a wired/wireless communication subsystem 842 (e.g., a network interface adapter, onboard transceiver subsystem, etc.) to communicate with wired/wireless networks, wired/wireless printers, wired/wireless input devices 844, and so on. The computer 802 can include a modem or other means for establishing communications over the network. In a networked environment, programs and data relative to the computer 802 can be stored in the remote memory/storage device, as is associated with a distributed system. It will be appreciated that the network connections shown are exemplary and other means of establishing a communications link between the computers can be used.

The computer 802 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi$^{TM}$ (used to certify the interoperability of wireless computer networking devices) for hotspots, WiMax, and BluetoothTM wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a text recognition component configured for recognition of text on a sequence of video frames, the text recognition component configured to receive a selected frame of the sequence of video frames and perform text recognition processing of the selected frame to output a selected frame result;
   a tracker component configured to select a keyframe from the sequence of video frames based on stability criteria applied to incoming frames and to establish a reference coordinate system relative to the selected keyframe, the selected frame result mapped back to the reference coordinate system of the keyframe, the tracker component configured to apply keyframe coordinates to subsequent video frames to enable accumulation of best results for text recognition rendering and viewing; and
   a microprocessor configured to execute computer-executable instructions associated with at least one of the text recognition component or the tracker component.

2. The system of claim 1, wherein the tracker component is configured to estimate a transformation between the reference coordinate system and the selected frame result.

3. The system of claim 1, wherein the reference coordinate system relates recognized text coordinates of the text of the selected frame back to the keyframe based on an estimated transformation established between the keyframe and the selected frame.

4. The system of claim 1, further comprising a selection component configured to select a frame result for rendering with the keyframe.

5. The system of claim 1, further comprising a conflation component configured to combine the selected frame result with a previously-accumulated frame result of another frame of the sequence of video frames.

6. The system of claim 5, wherein the conflation component employs statistical error correction to improve the conflated frame results.

7. The system of claim 5, wherein the conflated frame result is rendered on a display.

8. The system of claim 1, wherein the selected frame result is rendered directly into the selected frame.

9. The system of claim 1, wherein the selected frame result and a word bounding box are stored according to the reference coordinate system relative to the keyframe or the selected frame.

10. A method performed by a computer system executing machine-readable instructions in a hardware memory, the method comprising acts of:
    receiving a selected frame of a sequence of video frames for text recognition processing;
    choosing a keyframe from the sequence of video frames based on an application of stability criteria to incoming images;
    establishing a reference coordinate system relative to the keyframe for applying keyframe coordinates to subsequent video frames;
    recognition processing the selected frame to output a selected frame result;
    computing an estimated transformation between the keyframe and the selected frame result based on the reference coordinate system to create a keyframe result;
    storing the keyframe result of the selected frame for presentation to enable accumulation of best results for rendering and viewing; and
    configuring at least one processor to perform the acts of receiving, choosing, establishing, recognition processing, computing, and storing.

11. The method of claim 10, further comprising combining the keyframe result with a previously-accumulated keyframe result to create new accumulated keyframe results.

12. The method of claim 11, further comprising presenting the new accumulated keyframe results after each frame.

13. The method of claim 10, further comprising concurrently performing the acts of choosing, establishing, recognition processing, and computing.

14. The method of claim 10, further comprising tracking features in the selected frame to compute the estimated transformation.

15. The method of claim 10, further comprising rendering frame results directly into tracked video frames.

16. A method performed by a computer system executing machine-readable instructions in a hardware memory, the method comprising acts of:
    selecting a keyframe based on an application of stability criteria to incoming images;
    establishing a common coordinate system and a transformation based on the keyframe that relate subsequent video frames of a sequence of video frames to coordinates of the keyframe;
    concurrently with the act of establishing, performing text recognition processing of the video frames to compute frame text results;
    relating the frame text results back to the coordinates of the keyframe using the transformation;
    conflating the frame text results to determine an optimum frame text result for presentation; and
    storing the keyframe result of the selected frame for presentation to enable accumulation of best results for rendering and viewing; and
    configuring at least one processor to perform the acts of selecting, establishing, performing, relating, and conflating.

17. The method of claim 16, further comprising an act of registering the recognized frame text results to realtime video by applying the transformation from the keyframe coordinates to a latest frame being processed.

18. The method of claim 16, further comprising an act of combining a selected frame text result with previously-accumulated frame text result of another frame, as part of the act of conflating.

19. The method of claim 16, further comprising an act of establishing a transformation for each video frame to relate associated frame text results to the keyframe.

20. The method of claim 16, further comprising an act of tracking the recognized frame text results while asynchronously performing text recognition processing over the video frames.

* * * * *